United States Patent
Haase et al.

(10) Patent No.: US 7,558,254 B2
(45) Date of Patent: Jul. 7, 2009

(54) METHOD AND APPARATUS FOR CALL ROUTING VIA GATEWAY BROKERING

(75) Inventors: Oliver Haase, Fair Haven, NJ (US); Kazutaka Murakami, Freehold, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 697 days.

(21) Appl. No.: 10/915,217

(22) Filed: Aug. 10, 2004

(65) Prior Publication Data

US 2006/0034270 A1  Feb. 16, 2006

(51) Int. Cl.
*H04L 12/66* (2006.01)
(52) U.S. Cl. .................. 370/354; 370/355; 370/356; 370/401; 379/900; 709/245
(58) Field of Classification Search ......... 370/351–357, 370/389, 349, 392, 400–401, 466, 471, 395.31; 379/900; 709/227–231, 245
See application file for complete search history.

(56) References Cited

U.S. PATENT DOCUMENTS

| | | | | |
|---|---|---|---|---|
| 6,400,681 | B1* | 6/2002 | Bertin et al. ................. | 370/218 |
| 6,427,174 | B1* | 7/2002 | Sitaraman et al. ............ | 709/245 |
| 6,453,034 | B1* | 9/2002 | Donovan et al. ....... | 379/220.01 |
| 6,539,431 | B1* | 3/2003 | Sitaraman et al. ........... | 709/226 |
| 6,570,855 | B1* | 5/2003 | Kung et al. .................. | 370/237 |
| 6,961,322 | B2* | 11/2005 | Viola et al. .................. | 370/328 |
| 7,277,421 | B1* | 10/2007 | Pershan ....................... | 370/352 |
| 2002/0176405 | A1* | 11/2002 | Aijala .......................... | 370/352 |
| 2003/0050051 | A1* | 3/2003 | Vilander ...................... | 455/414 |
| 2003/0137991 | A1* | 7/2003 | Doshi et al. ................. | 370/466 |
| 2004/0047345 | A1* | 3/2004 | Joseph et al. ................ | 370/352 |
| 2004/0228324 | A1* | 11/2004 | Alexiou et al. .............. | 370/352 |
| 2004/0229608 | A1* | 11/2004 | Isukapalli et al. ......... | 455/432.1 |
| 2004/0240638 | A1* | 12/2004 | Donovan ................... | 379/88.17 |
| 2005/0058119 | A1* | 3/2005 | Inouchi et al. ............... | 370/351 |
| 2005/0086312 | A1* | 4/2005 | Goodman .................... | 709/206 |
| 2005/0186960 | A1* | 8/2005 | Jiang ........................ | 455/435.1 |
| 2006/0183499 | A1* | 8/2006 | Yegoshin .................. | 455/552.1 |

OTHER PUBLICATIONS

Yuan Zhang, "SIP-based VoIP network and its interworking with the PSTN," Electronics & Communication Engineering Journal, vol. 14, No. 6, pp. 273-282, Dec. 2002.*

(Continued)

*Primary Examiner*—Hassan Kizou
*Assistant Examiner*—Jeffrey M Rutkowski

(57) ABSTRACT

Method and apparatus for routing telephone calls across different types of networks includes means for and steps of determining a destination IP address of a new call according to initial conditions established in a first network, determining a destination gateway (gateway brokering) based on the destination IP address, the initial conditions and a gateway selection policy, providing routing information of the destination gateway to the first network and completing the new call set up via messages received from the gateway brokering step. The initial conditions in the first network are established by determining if a callee is part of an IP network or part of a CS network and converting the callee phone number to an SIP URL if the callee is part of the IP network. Such determination is made by recognizing a prefix identifying an IP destination in the callee phone number.

27 Claims, 6 Drawing Sheets

OTHER PUBLICATIONS

Bos, L.; Leroy, S., "Toward an all-IP-based UMTS system architecture," Network, IEEE, vol. 15, No. 1, pp. 36-45, Jan./Feb. 2001.*

Haase, Oliver, et al., Unified Mobility Manager: Enabling Efficient SIP/UMTS Mobile Network Control, IEEE Wireless Communications, Aug. 2003, pp. 66-75.

Rosenberg, J., et al., Standards Track, SIP: Session Initiation Protocol, IETF RFC 3261, © The Internet Society (2002), pp. 1-269.

3GPP TS 23.002 V6.5.0 (Jun. 2006), $3^{rd}$ Generation Partnership Project; Technical Specification Group Services and Systems Aspects; Network architecture (Release 6), Global System for Mobile Communications, © 2004, pp. 1-57.

Faltstrom, P., et al., The E.164 to Uniform Resource Identifiers (URI) Dynamic Delegation Discovery System (DDDS) Application (ENUM), , IETF RFC 2916, © The Internet Society (2004), pp. 1-18.

* cited by examiner

METHOD AND APPARATUS FOR CALL ROUTING VIA GATEWAY BROKERING

FIELD OF THE INVENTION

The invention relates to the field of communications systems and more specifically to the routing of telephone calls from a circuit-switched network to an IP-based network.

DESCRIPTION OF THE BACKGROUND ART

Telecommunications networks and other networks are increasing in both size and complexity in order to serve the growing demand for high speed communication links for the transfer of voice and/or data information. As these telecommunication networks approach capacity, alternate solutions or networks are sought to meet the demand for increasing network bandwidth.

Traditionally, voice calls are transported entirely over an end-to-end, circuit-switched (CS) Public Switched Telephone Network (PSTN). However, considerable attention has been directed toward the implementation of real-time communication across computer data (otherwise known as Internet Protocol, IP) networks, and particularly the ability to route voice traffic over these networks. Interest has also been raised in using Voice over IP (VoIP) solutions to facilitate voice communication between originating and terminating PSTN end points or from an originating PSTN point to an IP destination as such solutions substantially bypass the PSTN.

To facilitate call routing in such environments, originating and terminating switches can be connected to PSTN/IP gateways that belong to both the IP network and the PSTN. Based on the called number or other signaling indicator, the switches route certain calls through the IP gateways instead of the PSTN. In one typical example, Session Initiation Protocol (SIP) telephony is commonly used to establish the call set-up process. SIP is the predominant IETF standard and it is the chosen signaling protocol for upcoming 3GPP and 3GPP2 all-IP mobile networks.

The current approach for a CS to SIP call set-up includes a number of steps. In an IP network, call set-up (SIP INVITE) requests are addressed to SIP URLs (alphanumerical strings similar to email addresses that are associated with users rather than devices). Since SIP URLs cannot be dialed from a 12-key-pad of a typical telephone, a SIP user needs to get a phone number (pn) assigned in order to make him or her reachable from a CS network. In the CS network, pn is associated with one or a pool of telephony gateways. Accordingly, calls to pn are always routed to one of these associated gateways regardless of traffic levels at the associated gateway and actual location of the SIP end point. Next, the gateway either uses a pre-configured table that maps the phone numbers of its number range to SIP URLs, or it consults a server that stores these mappings in order to forward an incoming CS call request. Finally, the gateway converts the incoming CS call request to a SIP INVITE request with the SIP URL obtained earlier as the target address. This INVITE request is sent to the SIP network, where a SIP location service is used to map the personal SIP URL to a physical IP end point. After this address mapping in the SIP network, the call request is forwarded to the callee. The problem with this approach is that the telephony gateway is assigned without knowing the callee's current location. Specifically, a personal SIP URL does not contain routing information. As such, it has to be mapped to a physical IP address to complete the call set up. This mapping step is only done after the call has been routed to the SIP network (i.e., the call has been routed to the gateway associated with pn and then the physical IP endpoint is determined). As a consequence, optimal routing cannot be supported.

SUMMARY OF THE INVENTION

The disadvantages heretofore associated with the prior art are overcome by a novel method for routing telephone calls across different types of networks. Such method includes the steps of determining a destination IP address of a new call according to initial conditions established in a first network for gateway brokering of the new call from the first network to a second network, determining a destination gateway (gateway brokering) based on the destination IP address, the initial conditions and a gateway selection policy, providing routing information of the destination gateway to the first network and completing the new call set up via messages received from the gateway brokering step. The initial conditions in the first network are established by determining if a callee is part of an IP network or part of a CS network and converting the callee phone number to an SIP URL if the callee is part of the IP network. Such determination is made by recognizing a prefix identifying an IP destination in the callee phone number.

Determining a destination IP address includes interrogating a location server in the second network where the new call is to be terminated. In one embodiment of the invention, the interrogation and subsequent determination is conducted by an SDHLR subcomponent. Alternately, the interrogation and determination is made by a location server in the second network where the new call is to be terminated via an HLR and translator subcomponents. Determining a destination gateway includes selecting one of a plurality telephone numbers assigned to one of a plurality of gateways in the IP network. Additionally, providing information of the destination gateway includes sending information to components in the first network that are in communication with gateways in the second network.

The invention also includes a computer readable medium containing a program which, when executed, performs an operation of gateway brokering new telephone calls from a first network to a second network in accordance with the method steps described above.

The invention also includes an apparatus having means for maintaining a pool of telephone numbers assigned to a plurality of telephony gateways, means for determining an optimal gateway of the plurality of telephony gateways based on at least a terminating IP address of a callee, means for requesting a telephone number from the optimal gateway and means for releasing said telephone number from a mapping to the terminating IP address. The means for maintaining a pool of telephone numbers is a temporary SIP gateway number (TSGN) Manager that randomly selects a telephone number from the optimal gateway to be mapped to the terminating IP address. The means for determining an optimal gateway includes a TRIP server. The means for requesting a telephone number from the optimal gateway includes a TSGN Requestor and the means for releasing the telephone number from a mapping to the terminating IP address is a TSGN Resolver.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The subject invention establishes voice traffic over different networks (for example from a circuit-switched (CS) network to an Internet Protocol (IP) network) by determining a destination gateway from a destination IP address and other network conditions when setting up a new voice call traversing two such different networks. Accordingly, an exemplary telecommunications system is described as one potential environment in which the subject invention operates and exists. Other examples are possible and two specific additional systems are also described.

Figure 2:
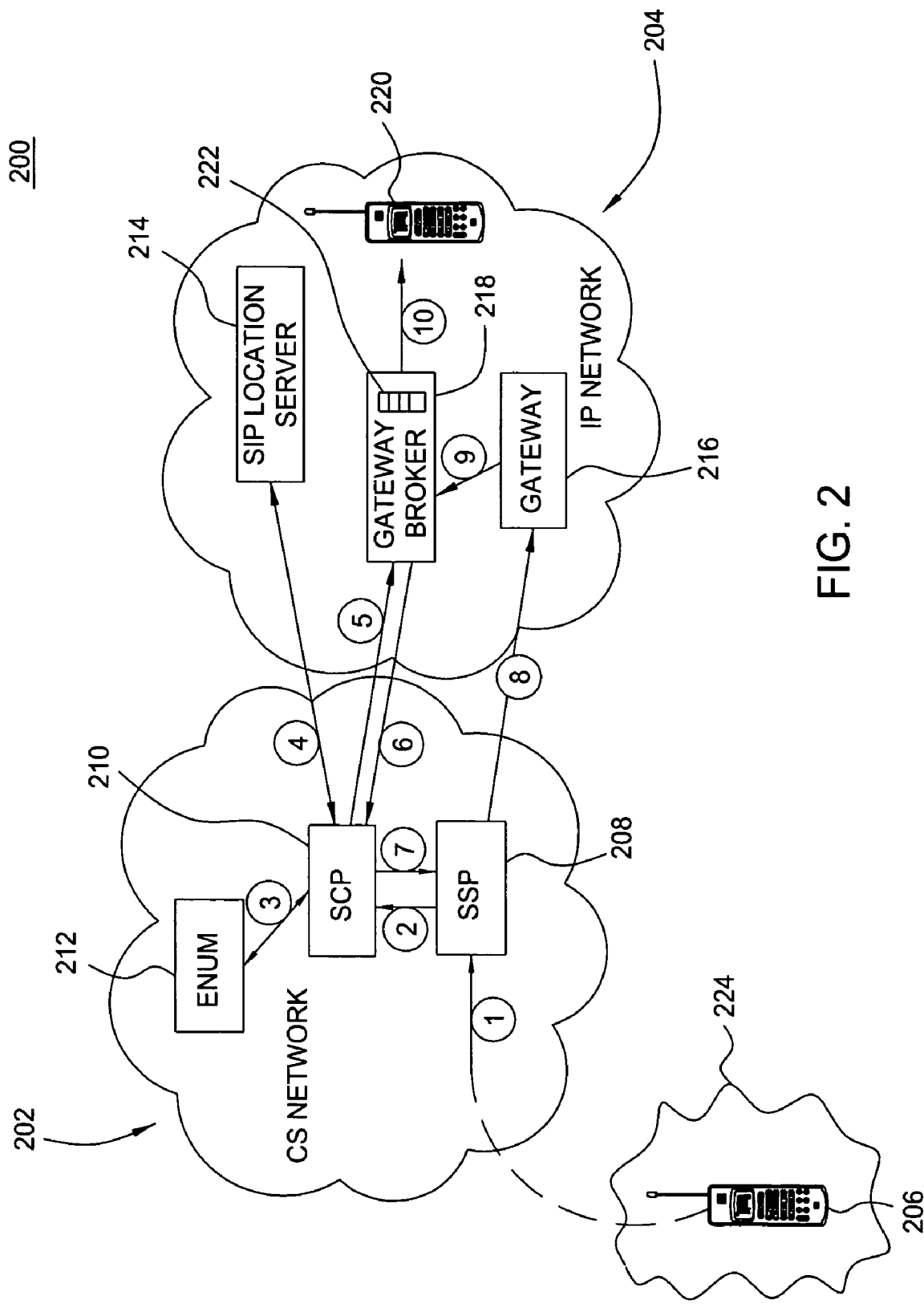
FIG. 2 depicts a general overview of a first type of communication network that employs a first embodiment of subject invention.

FIG. 2 depicts an exemplary callee (or destination) portion 200 of a larger telecommunications system (not shown) for routing telephone calls from a first network to a second network. More specifically, a caller 206 placing a call from another portion 224 (caller or originating portion) of the larger telecommunications system reaches a callee 220 by entering the callee (destination) portion 200. For example, the caller 206 could be a subscriber of a wire line network which simply passes a request for a new call to the callee 220. Alternately, the caller 206 could be a subscriber of mobile (wireless) network that first routes the call request to the caller portion 224 which is then passed to the callee 220. The callee (destination) portion 200 of the larger network includes a callee home network (first network) 202 and a callee target or visited network (second network) 204. In one example of the subject invention, the callee home network 202 is a wire line CS network and the callee target network 204 is an IP network; however, other variations and combinations are possible. In particular, examples of telecommunications systems based upon wireless networks and wireless networks using an SDHLR assisted environment are also possible. The callee home network 202 is the actual network that the callee's telephone number is assigned (i.e., the called number or address that the caller 206 dials) although the callee may not physically be in the home network 202. The target network 204 is the actual physical location where the callee is ultimately reached.

The telecommunications system destination portion 200 includes a circuit switched (CS) network 202, such as a PSTN as is well known in the art and an Internet Protocol (IP) network 204. An example of a suitable IP network that operates in accordance and in cooperation with the subject invention is, for example, a SIP network according to IETF RFC 3261. Since only a portion of new telephone calls that are being made will be traveling to the callee 220 via the IP network 204, a Service Switching Point (SSP) 208 is provided in the CS network 202 to recognize an IP based network phone call from a typical CS network phone call. Specifically, to reach callee 220 in the IP network 204 from the caller 206, callee 220 must have a phone number with a special prefix that is recognized by the SSP 208. Accordingly, when caller 206 enters the phone number of a callee 220 (as seen by step 1 in FIG. 2), the special prefix is recognized by the SSP 208 and a call initiation process is transferred to IN (Intelligent Network) components in the CS network 202 (as seen by step 2 in FIG. 2) rather than continuing with normal circuit switching. Specifically, and in one embodiment of the invention, an intelligent node in the CS network, identified as a Service Control Point (SCP) 210 is in communication with the SSP 208 and receives control of the call initiation process because of the recognition of the special number prefix of the callee's phone number. A first server 212 in communication with the SCP 210 in the CS network 202 converts the callee's phone number to an SIP URL (as seen by step 3 of FIG. 2) under the instruction of the SCP 210.

After the conversion process, the SCP 210 then contacts a second server 214 in the IP network. Specifically, second server 214 is an SIP location server which is in communication with and capable of providing fully routable IP addresses to the SCP 210 based on provided SIP URLs. Accordingly (and as seen by step 4 in FIG. 2), the SCP 210 interrogates the SIP location server 214 to obtain a suitable IP address in IP network 204 based on the callee telephone number.

Also found in the IP network 204 is a gateway broker 218 in communication with the SCP 210 and one or more gateways 216. The gateway broker 218 uses a source address, a destination address and a gateway selection policy to select an appropriate gateway (such as exemplary gateway 216 in IP network 204) to route the telephone call from caller 206 to callee 220. Since the gateway broker 218 has a variety of information available to it including routable destination information and a starting point (source address) and end point (destination address), the gateway broker 218 can administer the selection policy in such a manner so as to achieve routing optimization. Since the telecommunications system destination portion 200 is a dynamic environment (traffic flow changes, temporarily unavailable gateways, broken links and the like), optimization at the time of the call initiation process provides the caller with the best possible path at the time the call is initiated. Accordingly (and according to step 5 of FIG. 2), the SCP 210 sends the routable address received from the SIP location server 214 together with the IP address of the SSP 208, the current gateway selection policy in effect at the IP network 204 to the gateway broker 218 to allow it to select the best route for initiating the call. That is, although one gateway 216 is depicted in the IP network 204, there can be any number of gateways 216 provided in the IP network 204 to sufficiently cover all users of the network and provide the appropriate traffic flow for same.

The gateway broker 218 maintains a pool of routable phone numbers 222 for every gateway 216 in its domain. As such, it can allocate one of the selected gateway's routable phone numbers, (trn for temporary routing number), for the duration of the current call request. The gateway broker 218 stores a temporary mapping from trn to the target IP address, so it can route the call to the callee in a later step. Note that the mapping information is very short-lived. Specifically, and in one embodiment of the invention, the mapping will be automatically removed and the phone number will be automatically released into the pool of gateway numbers 222 after a few hundred milliseconds.

The gateway broker 218 returns the routable number, trn, to the SCP 210 (as seen in step 6 of FIG. 2). The trn is then passed to the SSP 210 (as seen in step 7 of FIG. 2). The SSP 210 then routes the call request to the selected gateway 216, by virtue of the routable phone number trn (as seen in step 8 of FIG. 2).

Since trn has been dynamically assigned for this individual call request, the mapping to the target address in the SIP network is not pre-configured in the gateway 216. Neither can it be brought into a distributed set of ENUM servers 212 at the required speed and with the desired short life span.

As the entity that holds the needed mapping information is the gateway broker 218, the gateway 216 directs the call request to the gateway broker. This is done by either pre-configuring the gateway 216 to generically map any incoming phone number, pn, to a SIP URL of the form SIP:pn@gatewaybroker, or by having it receive this (static) mapping information from an ENUM server. Either way, the gateway 216 will send an INVITE SIP:pn@gatewaybroker request to the gateway broker 218 (as seen in step 9 of FIG. 2).

Next, the gateway broker 218 completes the new call set up based on the previous information. Specifically, in one example of the call completion process, the gateway broker 218 acts as a SIP redirect server, looks up the SIP target address from its mapping table, and returns it in a response message to the gateway 216. In this example, the gateway 216 will send a modified INVITE request to the routable IP address. In a second example of the call completion process, the gateway broker 218 acts as a SIP proxy server, looks up the SIP target address from its mapping table, and directly forwards the INVITE to the callee. FIG. 2 shows the proxy case for step 10 of the call set-up scenario. After step 10, the routable phone number, trn, is released and returned into the pool of available routing numbers 222.

Figure 3:
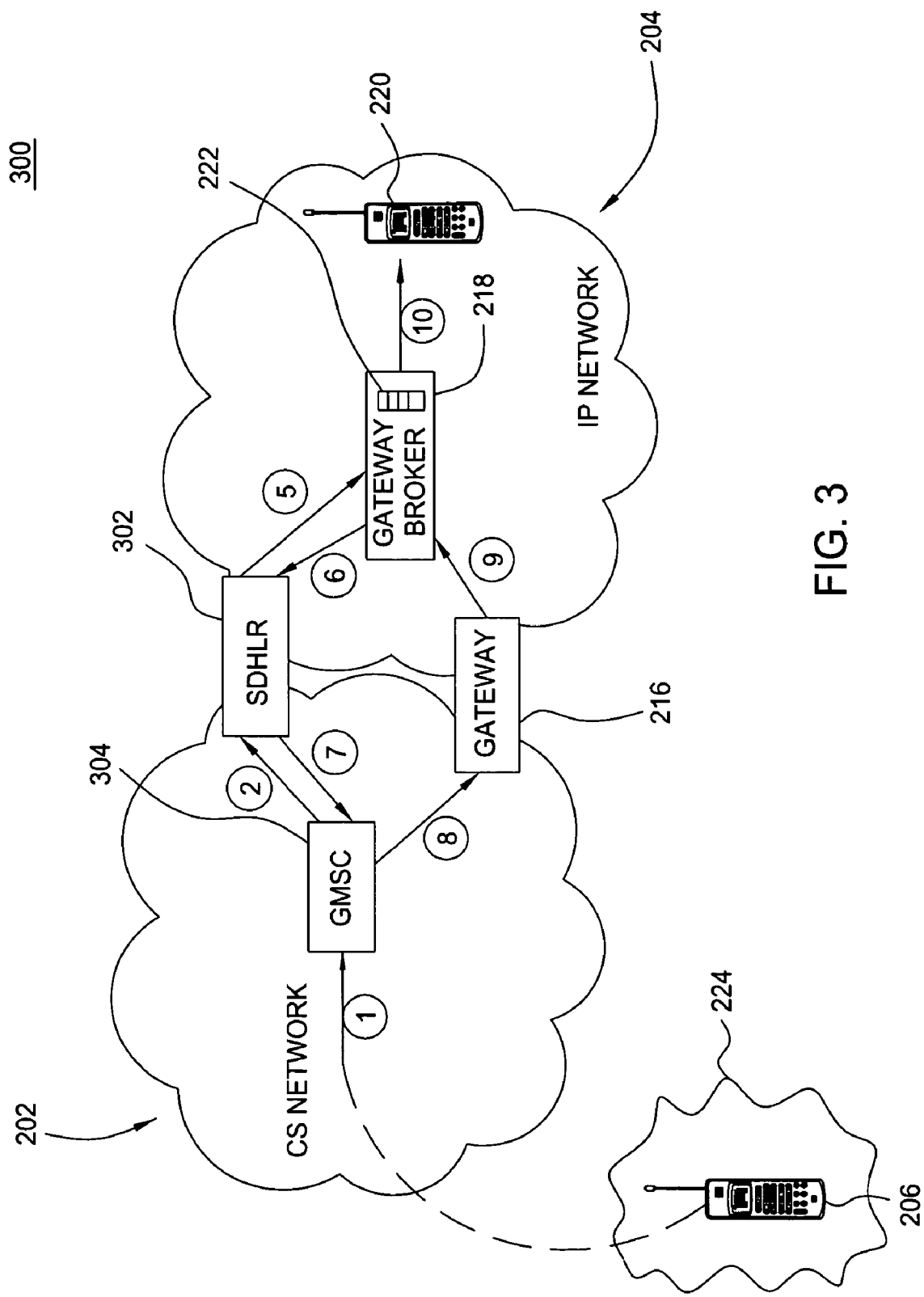
FIG. 3 depicts a general overview of a second type of communication network that employs a second embodiment of subject invention.

FIG. 3 depicts a second example of a telecommunications system destination portion 300 in accordance with the subject invention. Specifically, the subject destination portion 300 depicts an architecture where calls to a Super Distributed Home Location Register (SDHLR) equipped mobile (wireless) network 202 can be routed to an IP telephony network 204. Similar to FIG. 2, network 202 is the network that the called number or address is assigned to and not the caller's network (i.e., caller 206 could be in the PSTN, in which case the call is first routed from the PSTN to the SDHLR enabled mobile network). The destination portion 300 resembles destination portion 200 of FIG. 2 in a basic layout and overall results for establishing calls; however, there are a few minor organizational differences that are described in detail as follows. Specifically, instead of having the initial calling party pass the callee number to the SSP 208, it is passed to a gateway mobile switching center (GMSC) 304 in the CS network 202 in step 1. This is a result of the callee number's being assigned to the wireless network 202. In step 2, the information that is normally passed between the first server SCP 210, first server 212 and the SIP location server 214 of the previous destination portion 200, are now passed to a SDHLR module 302 that is in communication with the GMSC 304 and bridges the CS network 202 and IP network 204. The SDHLR 302 is capable of performing the functions described in steps 3 and 4 of destination portion 200 of FIG. 2; as such, these steps are not specifically identified in FIG. 3. Detailed information regarding the workings of the operational aspects of the SDHLR can be found in "Unified Mobility Manager; Enabling Efficient SIP/UMTS Mobile Network Control" by Haase, Murakami and LaPorta; *IEEE WIRELESS COMMUNICATIONS*, August 2003, pp. 66-75 herein incorporated by reference. Additionally, operation of a GMSC such as GMSC 304 of FIG. 3 can be found in 3GPP (3$^{rd}$ Generation Partnership Project) TS (Technical Specification) 23.002.

After addressing information is determined by the SDHLR 302, the source address, destination address and selection policy information are provided to the gateway broker 218 of the existing IP network 204 which is in communication with the SDHLR 302. Accordingly, operations identical to operations presented as step 5 in destination portion 200 of FIG. 2 occur. Resulting information regarding an appropriate gateway is passed back to the SDHLR 302 from the gateway broker 218 in step 6 and back through to the GMSC 304 from the SDHLR 302 in step 7 similar to the backtracking patterns of steps 6 and 7 in destination portion 200. Resultantly, information regarding the final call setup of procedures discussed in steps 8, 9 and 10 are essentially duplicated in destination portion 300 with the only difference being that the information is initially passed from GMSC 304 instead of from the SSP 208 of the previous example.

Figure 4:
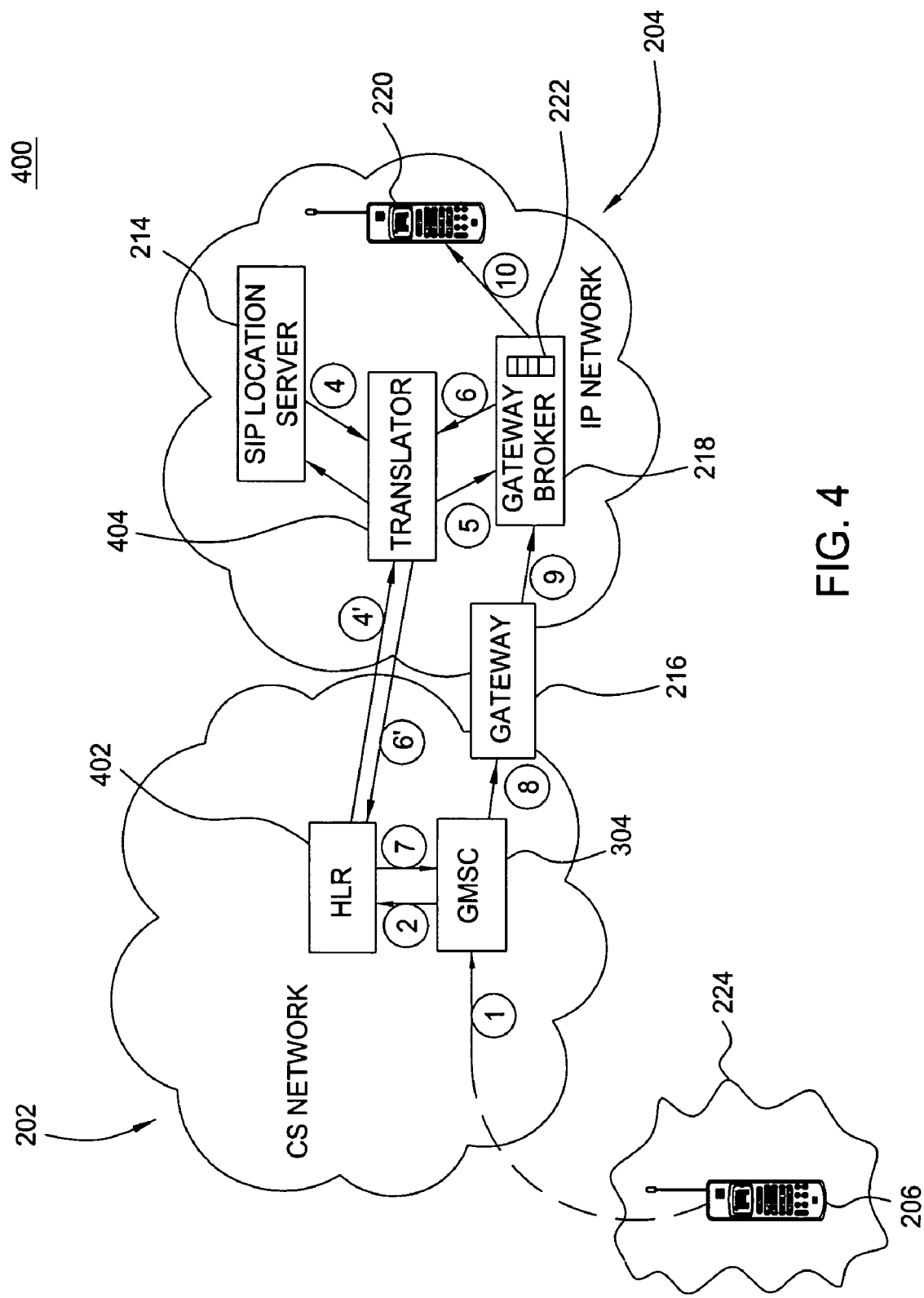
FIG. 4 depicts a general overview of a third type of communication network that employs a third embodiment of subject invention.

FIG. 4 depicts a third example of a telecommunications system destination portion 400 operating in accordance with the subject invention. Specifically, the subject embodiment depicts an architecture where calls into a wireless network 202 that does not employ SDHLR components and methodologies can be routed to an IP telephony network 204. Accordingly, there are similarities to portion 400 and portion 300 (as in both cases the called address belongs to a wireless communications network); however, there are minor differences which are described below. Specifically, the subject embodiment does not make use of a SDHLR subcomponent. As such, this embodiment covers communications systems that may not have the same level of sophistication as the wireless destination portion 300 previously described, but is still capable of taking advantage of optimal call routing capabilities in a slightly different network configuration.

In particular, destination portion 400 includes a home location register (HLR) 402 component located in the CS network 202 in communication with the GMSC 304. HLR's are well known components and operate in accordance with for example 3GPP (3rd Generation Partnership Project) TS (Technical Specification) 23.002. Additionally, a translator 404 is used that is connected to both the CS network 202 and the IP network 204. The translator appears as a Serving MSC to the HLR, and can communicate with the SIP location server 214 and the Gateway Broker 218 in the IP network. The principle differences between telecommunications system destination portion 300 and telecommunications system destination portion 400 is that the tasks of determining the appropriate IP address for the destination follows a two-part sequence instead of being contained and conducted entirely in the SDHLR 302. For example, in destination portion 400, once the caller 206 has passed information to the GMSC 304, this information is passed to the HLR 402. Information from the HLR 402 is then passed to the translator 404 where an operation occurs to translate the telephone number based information into the SIP URL of the destination 220 (as seen by step 4' of FIG. 4). Once the SIP URL is determined, access to the SIP location server 214 reveals the IP address of destination 220 (as seen by step 4 of FIG. 4). Once information is received from the SIP location server, the source, destination and gateway selection protocol information is passed from the translator 404 to the gateway broker 218 (as seen by step 5 of FIG. 4) to establish the appropriate brokering of a suitable gateway for the call initiation process. Once the appropriate gateway information is determined by the broker, and a trn has been returned to the translator (as seen by step 6), the trn is passed back to the HLR (as seen by step 6'). Subsequently, the appropriate information is passed back to the GMSC 304, and then on to the appropriate gateway, through the gateway broker 218, and eventually to the callee 220 to complete the call initiation process (as seen by steps 7-10). Note that in each of the destination portions described 200, 300 and 400, steps 1-10 have been carried through to properly identify each of the steps taken and by the interrelated components (although some components may be different from others) to arrive at the end result of a call set up accomplished by way of an optimized routing configuration determined by the gateway broker 218.

In each of the above-identified network portions, the components that are well known to those skilled in the art such as servers 212, 214, gateways 216 and GMSCs 304 are combinations of hardware, software and middleware and are otherwise known to those skilled in the art. Examples of such components can be found, for example, at Internet Engineering Task Force (IETF): Request For Comments(RFC) 3761 for the ENUM server, IETF RFC 3261 for SIP location service and Gateways and 3GPP ($3^{rd}$ Generation Partnership Project) TS (Technical Specification) 23.002 for GMSC's 304. Elements SSP 208 and SCP 210 are standard IN (Intelligent Network) elements such as those presented in T. Magedanz, R. Popescu-Zeletin: Intelligent Networks—Basic Technology, Standards and Evolution, International Thomson Computer Press.

Figure 6:
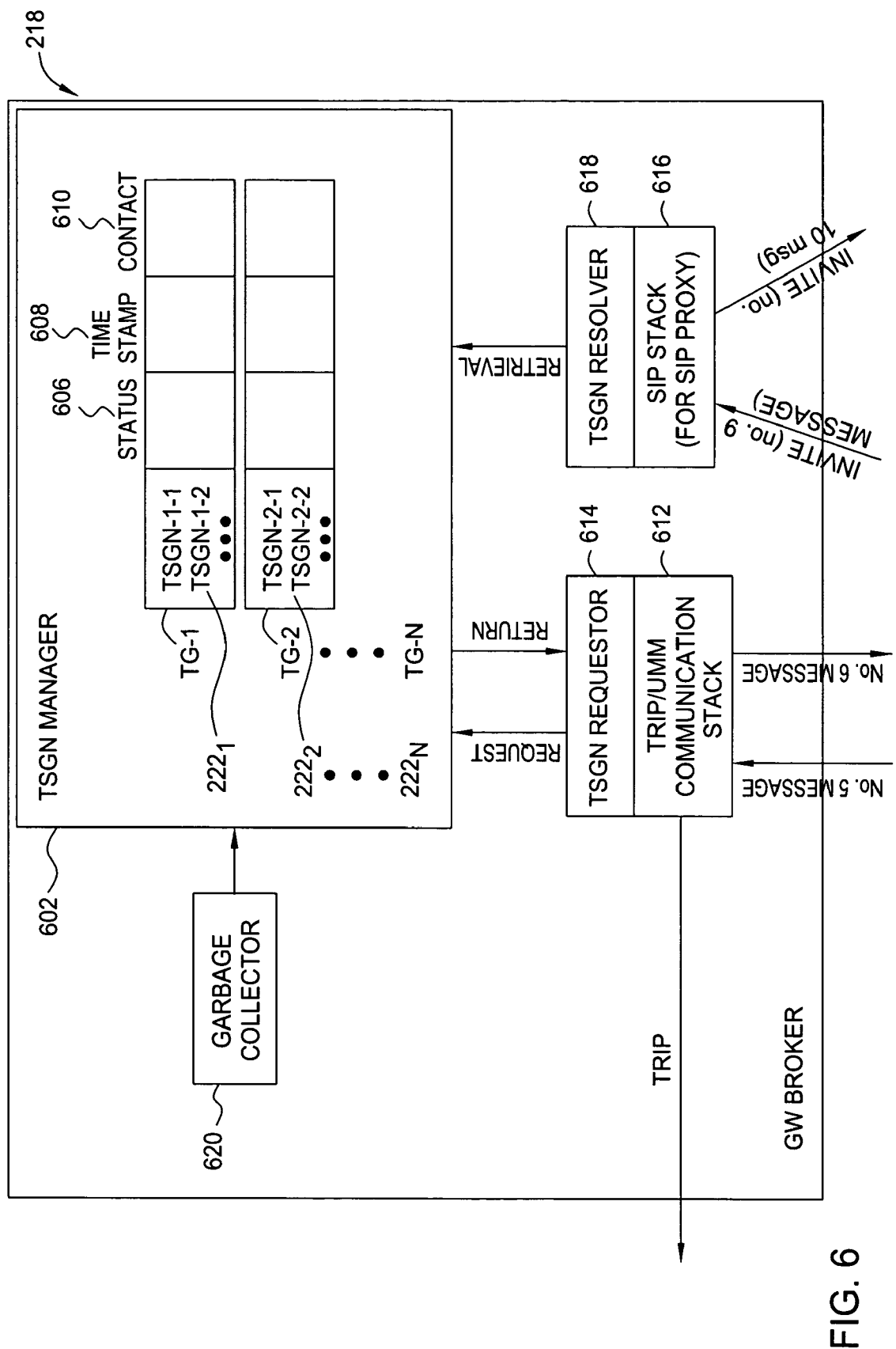
FIG. 6 is a detailed block diagram of the gateway broker of the subject invention.

The gateway broker 218 in each of the network portions discussed above is shown in detail in FIG. 6. Specifically, FIG. 6 depicts a logic block diagram of the gateway broker 218. Each of the components can be implemented in soft or in hardware by those of ordinary skill in the art once the basic tasks and operation of the gateway broker are provided. The gateway broker 218 further comprises a temporary SIP gateway number (TSGN) Manager 602 which is in communication with a TRIP server 612, TSGN Requester 614 and SIP stack 616 and a TSGN Resolver 618. Additionally, the TSGN Manager 602 is also in communication with a Garbage Collector 620. The TSGN Manager 602 maintains a list of telephony gateways for new call routing. For example, there are a plurality of gateways TG-1, TG-2 . . . TG-N. For each of the gateways TG-N, the TSGN Manager 602 maintains a pool of telephone numbers $222_1$, $222_2$ . . . $222_N$. Such set up is based on the assumption that each telephony gateway TG-N terminates a preconfigured set of telephone numbers much in the same way that a telephone switch is responsible to route calls to a certain range of telephone numbers. For each telephone number $222_N$ in each corresponding pool of telephone numbers, the TSGN Manager 602 also maintains availability status information. For example, for telephone number TSGN-1-1 (as well as other such numbers in that gateway and other gateways), there is a status identifier field 606 which indicates whether that particular telephone number is available or in use. There is also a timestamp field 608 which indicates when the status of such telephone number has changed. Additionally, there is a contact name field 610 attached to each telephone number.

When a request message (in accordance with step 5 of FIGS. 2, 3 or 4) arrives at the gateway broker 218, the gateway broker 218 interrogates the TRIP server 612 to retrieve an optimal gateway given the initial conditions established for the new call set up. For example, as discussed earlier, such initial conditions include the originating address of the caller, the terminating contact address of the callee and network policies for determining the appropriate gateway. After the interrogation is performed, the TSGN Requester 614 requests a telephone number (e.g., TSGN-1-2 of gateway TG-1 from the TSGN Manager 602). The TSGN Manager 602 randomly selects an available telephone number from the selected gateway's pool of available numbers, changes such telephone number's status to "used" and sets the appropriate timestamp of said selected telephone number to the current time. Additionally, the TSGN Manager 602 stores a temporary mapping from the selected telephone number to the contact address and returns the phone number to the TSGN Requester 614. In turn, the telephone number is sent out of the gateway broker 218 as the response message number (step 6 as identified in any of FIGS. 2, 3 or 4).

When a SIP INVITE request (such as step 9 in any of FIGS. 2, 3 or 4) with a target address of pn@gatewaybroker 218 comes in, the TSGN Resolver 618 requests that the TSGN Manager 602 retrieve the contact address from its mapping table and release the phone number (change the status from "used" to "available"). The TSGN Resolver 618 then forwards the INVITE request to the destination contact (as step 10 in any of FIGS. 2, 3 or 4). Such incoming request (step 9) and outgoing INVITE information (step 10) are processed through the SIP stack 616. Additionally, the gateway broker 218 also runs a periodic garbage collection process via the garbage collector 620. Specifically, this garbage collection process releases all used telephone numbers whose timestamp is beyond a certain threshold time. For example, in one embodiment of the invention, a telephone number can be released after a few (approximately 2-5) seconds if an INVITE message in accordance with step 9 does not arrive after such telephone number had gone through the selection process by the TSGN Manager 602 as described above.

Figure 1:
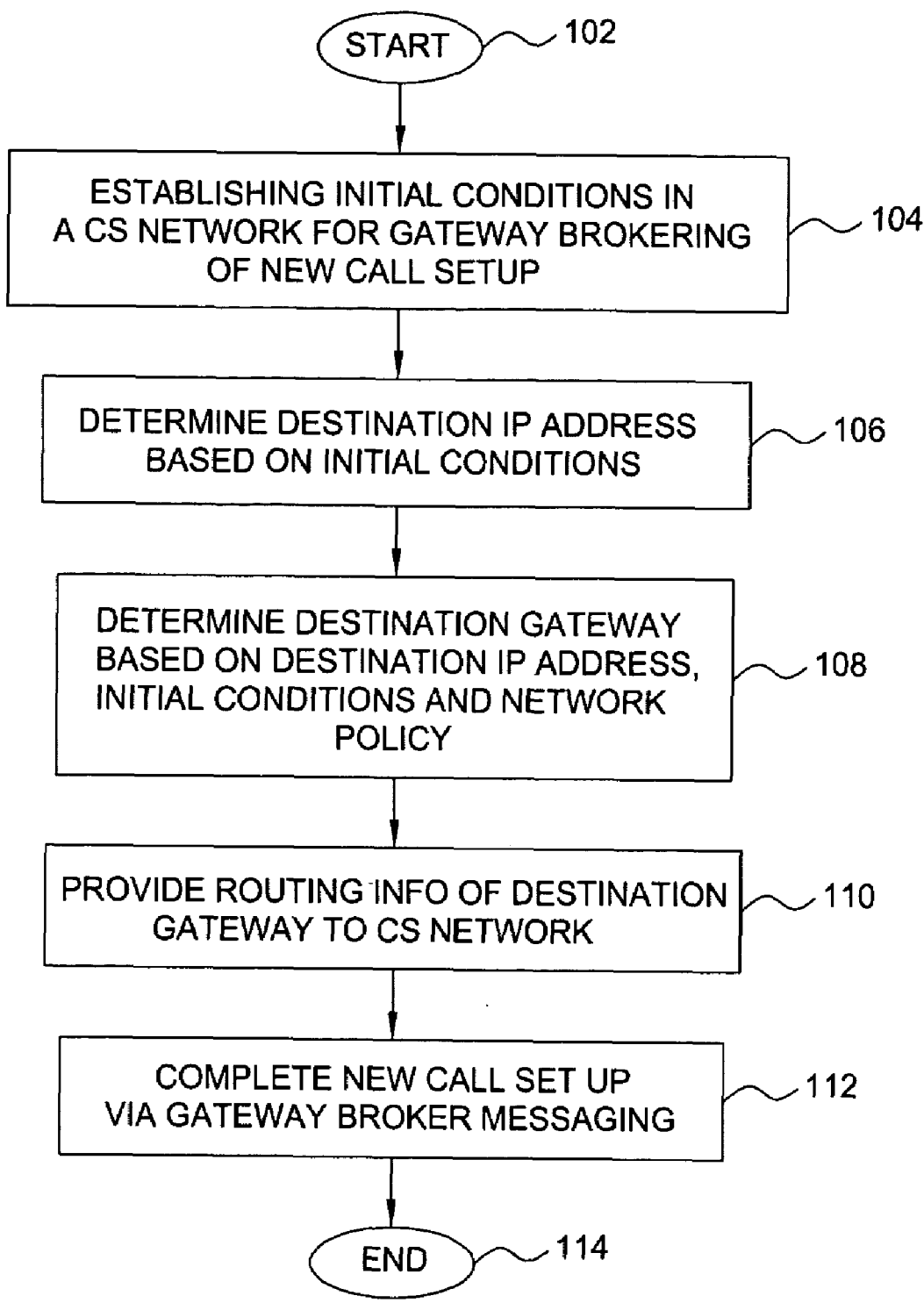
FIG. 1 depicts a series of method steps for call routing via brokering in accordance with the subject invention.

A method in accordance with the subject invention is depicted in FIG. 1. Specifically, FIG. 1 depicts a flow chart comprising a plurality of method steps 100 for determining an optimized call routing by way of gateway brokering in accordance with the subject invention. The method starts at step 102 and proceeds to step 104 where initial conditions in a CS network (such as CS network 202 in the accompanying figures) are established for gateway brokering of a new call set up. Establishing the initial conditions includes steps selected from the group consisting of determining if a callee is part of an IP network or part of the CS network and converting the callee phone number to an SIP URL.

In step 106, a determination is made for the destination IP address of the callee based on the initial conditions. Particularly, a location server (such as location server 214 of destination portions 200 and/or 400) is interrogated to find a fully routable IP address for the SIP URL that was determined in step 104. Such determination can also be made by a SDHLR subcomponent such as SDHLR 302 found in telecommunications system destination portion 300.

At step 108, a destination gateway is determined based upon the initial conditions, gateway selection policy in effect at the time the call needs to be established, and the destination IP address determined at step 106. This step is formally recognized as gateway brokering in that the selection is made not based upon a static assignment of telephone numbers and IP address, but rather a dynamic assignment of an appropriate telephone number from any gateway that has an optimal path based on conditions in the network at the time the call request and initiation process is made.

At step 110, destination gateway routing information is provided to the CS network so that the determined destination gateway can be properly accessed. In one embodiment of the preferred invention, information determined by the gateway broker is sent back through the IP network 204 to components in the CS network that have access to or otherwise in communication with all gateways in the communications network.

At step 112, the new call set up is completed via the information provided by the gateway broker. Specifically, the new gateway is contacted and the appropriate call initiation protocols are followed to set up a new call from the calling party 206 to the callee 220. The method ends at step 114.

Figure 5:
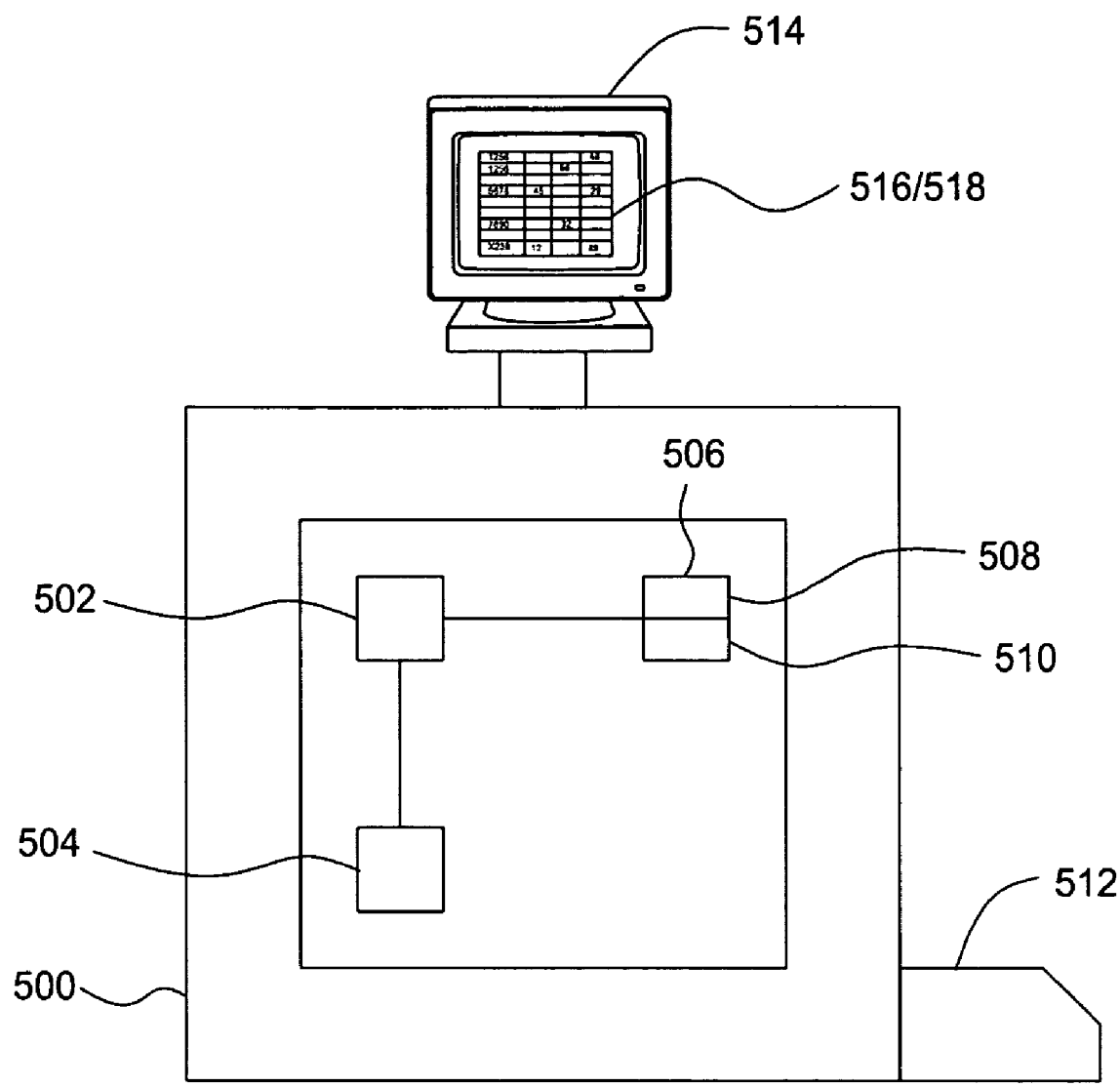
FIG. 5 depicts an apparatus for determining network topology in accordance with the subject invention.

An apparatus in accordance with one embodiment of the subject invention is presented in FIG. 5. Specifically, FIG. 5 depicts a computer 500 (personal computer, networked workstation, network server or the like). The computer 500 includes at least one central processing unit (CPU) 502, support circuits 504, and memory 506. The CPU 502 may comprise one or more conventionally available microprocessors. The support circuits 504 are well known circuits that comprise power supplies, clocks, input/output interface circuitry and the like. Memory 506 comprises various types of computer readable medium including, but not limited to random access memory, read only memory, removable disk memory, flash memory and various combinations of these types of memory. The memory 506 is sometimes referred to as main memory and may in part be used as cache memory or buffer memory. The memory 506 stores various software packages 508-510 that perform operations essential to the computer 500 and/or interconnected workstations, servers and the like if operating in a network environment. When running a particular software package or program 508-510, the computer 500 becomes a special purpose machine for determining optical pathways via gateway brokering for establishing new call set ups. More specifically, the computer 500 becomes a special purpose machine for conducting gateway brokering in the manner described above in accordance with method steps 100 of FIG. 1 described above.

The computer may contain one or more interfaces 512 selected from the group consisting of a keyboard, mouse, touch screen, keypad, voice-activated interface for entering data and/or executing management command functions in the network including but not limited to the configuration of the sniffer as a partition designated node as described above. Such information can be displayed in a network status display 516 on display device 514. While FIG. 5 and accompanying description discusses one computer, this is not to be taken as a limiting aspect of the invention. Specifically, the program or programs 508, 510 may be housed in various locations as a plurality of subroutines at different portions of the destination portions 200, 300 and 400. For example, certain aspects of the invention may be contained in subcomponents such as SSP 208, SCP 210, gateway broker 218, GMSC 304, SDHLR 302, HLR 401 and translator 404.

Although various embodiments which incorporate the teachings of the present invention have been shown and described in detail herein, those skilled in the art can readily devise many other varied embodiments that still incorporate these teachings.

We claim:

1. A method for gateway brokering a new call to a callee, the method comprising:
   determining a destination IP address of the callee based on initial conditions established in a first network for gateway brokering the new call from the first network to a second network;
   determining based on the destination IP address, the initial conditions, and a gateway selection policy, by a gateway broker, a destination gateway of a plurality of gateways associated with the gateway broker, wherein the gateway broker is configured:
      to maintain a respective pool of telephone numbers assigned to each of the plurality of gateways and
      to allocate temporarily, for the new call, one of a plurality of telephone numbers associated with the destination gateway;
   providing routing information of the destination gateway, including the allocated telephone number, to the first network; and
   completing set up of the new call using information provided by the gateway broker.

2. The method of claim 1 wherein the initial conditions in the first network are established by:
   determining if the callee is part of an IP network or part of a CS network; and
   converting a phone number of the callee to an SIP URL if the callee is part of the IP network.

3. The method of claim 2, wherein the determining if the callee is part of an IP network or part of a CS network is performed by recognizing a prefix identifying an IP destination in the callee phone number.

4. The method of claim 2, wherein the callee phone number is converted to the SIP URL by accessing a server in the CS network.

5. The method of claim 1, wherein the determining the destination IP address of the callee further comprises:
   interrogating a location server in the second network, wherein the second network is where the new call is to be terminated.

6. The method of claim 1, wherein the determining the destination IP address of the callee is conducted by an SDHLR subcomponent.

7. The method of claim 1, wherein the interrogation and determination is made by an HLR and translator subcomponents of the second network, wherein the second network is where the new call is to be terminated.

8. The method of claim 1, wherein:
   the first network is a home network of the callee that a phone number of the callee is assigned; and
   the second network is a visiting network of the callee, where the callee is physically located.

9. The method of claim 1, wherein the providing the routing information of the destination gateway further comprises:
   sending information to components in the first network that are in communication with gateways in the second network.

10. The method of claim 1, further comprising:
    releasing the allocated telephone number upon receiving an INVITE request associated with the destination IP address.

11. The method of claim 10, further comprising:
    releasing the allocated telephone number if the INVITE request associated with the terminating IP address fail to arrive within a pre-determined period of time.

12. A computer readable storage medium containing a program which, when executed, performs an operation of gateway brokering a new call from a first network to a second network, the operation comprising:
    determining a destination IP address of a callee for the new call based on initial conditions established in the first network for gateway brokering the new call from the first network to the second network;
    determining based on the destination IP address, the initial conditions, and a gateway selection policy, by a gateway broker, a destination gateway of a plurality of gateways associated with the gateway broker, wherein the gateway broker is configured:
       to maintain a respective pool of telephone numbers assigned to each of the plurality of gateways and to allocate temporarily, for the new call, one of a plurality of telephone numbers associated with the destination gateway;

providing routing information of the destination gateway, including the allocated telephone number, to the first network; and completing set up of the new call using information provided by the gateway broker.

13. The computer readable storage medium of claim 12, wherein the initial conditions in the first network are established by determining if the callee is part of an IP network or part of a CS network and converting a phone number of the callee to an SIP URL if the callee is part of the IP network.

14. The computer readable storage medium of claim 13, wherein the determining if the callee is part of an IP network or part of a CS network is performed by recognizing a prefix identifying an IP destination in the callee phone number.

15. The computer readable storage medium of claim 13, wherein the callee phone number is converted to the SIP URL by accessing a server in the CS network.

16. The computer readable storage medium of claim 12, wherein the determining the destination IP address of the callee further comprises:

interrogating a location server in the second network, wherein the second network is where the new call is to be terminated.

17. The computer readable storage medium of claim 12, wherein the determining the destination IP address of the callee is conducted by an SDHLR subcomponent.

18. The computer readable storage medium of claim 12, wherein the determining the destination IP address of the callee is made by an HLR and translator subcomponents of the second network, wherein the second network is where the new call is to be terminated.

19. The computer readable storage medium of claim 12, wherein:

the first network is a home network of the callee that a phone number of the callee is assigned to; and the second network is a visiting network of the callee where the callee is physically located.

20. The computer readable storage medium of claim 12, wherein the providing the routing information of the destination gateway further comprises:

sending information to components in the first network that are in communication with gateways in the second network.

21. An apparatus comprising:

means for maintaining a respective pool of telephone numbers assigned to each of a plurality of telephony gateways, the plurality of telephony gateways being associated with the apparatus;

means for determining an optimal gateway of the plurality of telephony gateways based on at least a terminating IP address of a callee;

means for selecting a temporary telephone number for the optimal gateway among telephone numbers of the respective pool of telephone numbers assigned to the optimal gateway;

means for storing a mapping of the temporary telephone number to the terminating IP address of the callee; and means for releasing the temporary telephone number from the mapping to the terminating IP address.

22. The apparatus of claim 21, wherein the means for maintaining is configured to maintain an availability status of each telephone number within each of the corresponding pool of telephone numbers.

23. The apparatus of claim 22, wherein the means for maintaining is further configured to select randomly the temporary telephone number to be mapped to the terminating IP address among available telephone numbers of a pool of telephone numbers assigned to the optimal gateway.

24. The apparatus of claim 21, wherein the means for determining determines the optimal gateway of the plurality of telephony gateways based also on at least an originating address of a caller.

25. The apparatus of claim 21, wherein the means for releasing release the temporary telephone number from the mapping to the terminating IP address upon receiving an INVITE request associated with the terminating IP address.

26. The apparatus of claim 25, further comprising:

a means for releasing the temporary telephone number from the mapping to the terminating IP address if the INVITE request associated with the terminating IP address fail to arrive within a pre-determined period of time.

27. A gateway broker comprising:

a TRIP server configured to determine an optimal gateway of a plurality of telephony gateways based on at least a terminating IP address of a callee, the plurality of telephony gateways being associated with the gateway broker; and a temporary SIP gateway number (TSGN) Manager in communication with the TRIP server, the TSGN Manager configured to:

maintain, for each of the plurality of telephony gateways, a corresponding pool of telephone numbers assigned to the telephony gateway;

maintain an availability status of each telephone number within each of the corresponding pool of telephone numbers;

to select, for the optimal gateway, a temporary telephone number among available telephone numbers assigned to the optimal gateway;

to store a mapping of the temporary telephone number to the terminating IP address of the callee; and to release the temporary telephone number from the mapping to the terminating IP address of the callee.

* * * * *